US012589562B2

(12) United States Patent   (10) Patent No.: US 12,589,562 B2
Marchal et al.                  (45) Date of Patent: Mar. 31, 2026

(54) REPLICABLE SHAPING OF A FIBER BLANK

(71) Applicant: SAFRAN AIRCRAFT ENGINES, Paris (FR)

(72) Inventors: Yann Didier Simon Marchal, Moissy-Cramayel (FR); Daniel Youngberg, Rochester, NH (US)

(73) Assignee: SAFRAN AIRCRAFT ENGINES, Paris (FR)

( * ) Notice: Subject to any disclaimer, the term of this patent is extended or adjusted under 35 U.S.C. 154(b) by 97 days.

(21) Appl. No.: 18/572,016

(22) PCT Filed: Jun. 23, 2022

(86) PCT No.: PCT/FR2022/051223
§ 371 (c)(1),
(2) Date: Dec. 19, 2023

(87) PCT Pub. No.: WO2023/275458
PCT Pub. Date: Jan. 5, 2023

(65) Prior Publication Data
US 2024/0278512 A1      Aug. 22, 2024

Related U.S. Application Data

(60) Provisional application No. 63/216,250, filed on Jun. 29, 2021.

(30) Foreign Application Priority Data

Apr. 12, 2022   (FR) ....................................... 2203364

(51) Int. Cl.
*B29C 70/54*          (2006.01)
*B29C 70/48*          (2006.01)
(Continued)

(52) U.S. Cl.
CPC ............ *B29C 70/543* (2013.01); *B29C 70/48* (2013.01); *B29C 70/541* (2013.01); *B29C 70/88* (2013.01); *B29L 2031/082* (2013.01)

(58) Field of Classification Search
CPC ..... B29C 70/543; B29C 70/541; B29C 70/48; B29C 70/02
See application file for complete search history.

(56) References Cited

U.S. PATENT DOCUMENTS 7,101,154 B2   9/2006   Dambrine et al.
7,241,112 B2   7/2007   Dambrine et al.
(Continued)

FOREIGN PATENT DOCUMENTS

| FR | 3 046 563 A1 | 7/2017 |
| FR | 3 046 564 A1 | 7/2017 |
| WO | WO 2010/061140 A1 | 6/2010 |

OTHER PUBLICATIONS

Qin, Z., P. Weng, J. Sun, J. Lu, H. Qiao, Precise Robotic Assembly for Large-Scale Objects Based on Automatic Guidance and Alignment, IEEE Transactions on Instrumentation and Measurement, vol. 65, No. 6 (Jun. 2016), pp. 1398-1411. (Year: 2016).*
(Continued)

*Primary Examiner* — Matthew J Daniels
(74) *Attorney, Agent, or Firm* — CUSHMAN PARTNERS

(57) ABSTRACT

A method for shaping a fiber blank including a warp tracer thread and at least one weft tracer thread, includes the projection of a warp visual reference onto the fiber blank corresponding to a reference location of the warp tracer thread, the deformation of the blank from the bottom of the airfoil blank to the top of the airfoil blank such as to make the warp tracer thread correspond with its visual reference, the projection of a weft visual reference on the fiber blank corresponding to a reference location of the weft tracer thread, and the deformation of the blank from the warp
(Continued)

tracer thread to the first edge and to the second edge of the blank such as to make the weft tracer thread correspond with its visual reference.

8 Claims, 9 Drawing Sheets

(51) Int. Cl.
   B29C 70/88        (2006.01)
   *B29L 31/08*        (2006.01)

(56)                References Cited

U.S. PATENT DOCUMENTS

| | | | |
|---|---|---|---|
| 9,457,435 | B2 | 10/2016 | Mathon et al. |
| 2007/0092379 | A1* | 4/2007 | Coupe ................... F04D 29/324 |
| | | | 264/103 |
| 2015/0165571 | A1 | 6/2015 | Marchal et al. |
| 2016/0243777 | A1 | 8/2016 | Marchal et al. |
| 2016/0245103 | A1* | 8/2016 | Gimat ................... F01D 25/005 |
| 2016/0288380 | A1 | 10/2016 | Marchal et al. |

OTHER PUBLICATIONS

International Search Report as issued in International Patent Application No. PCT/FR2022/051223, dated Oct. 21, 2022.

* cited by examiner

[Fig. 1]
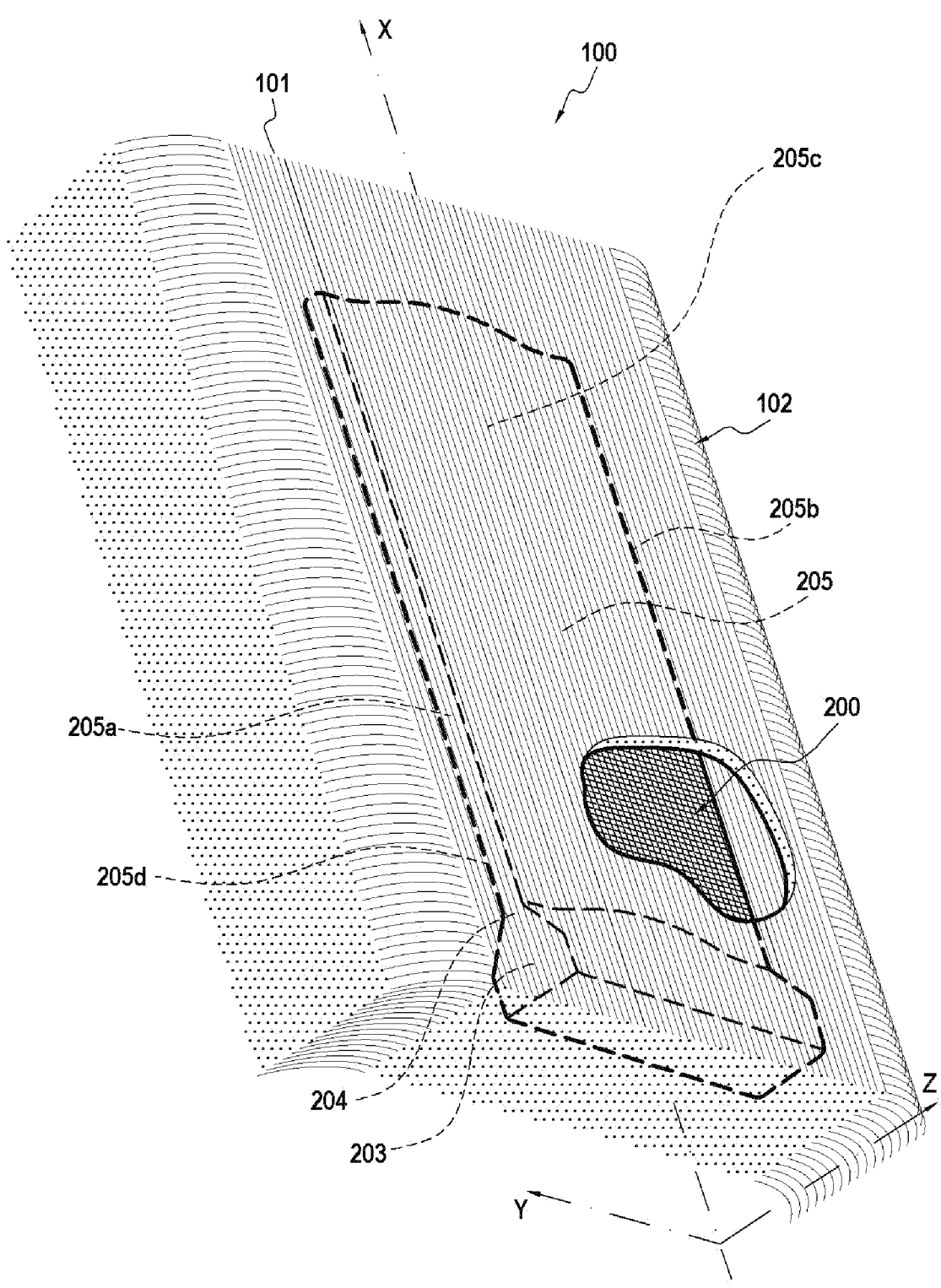

[Fig. 2]
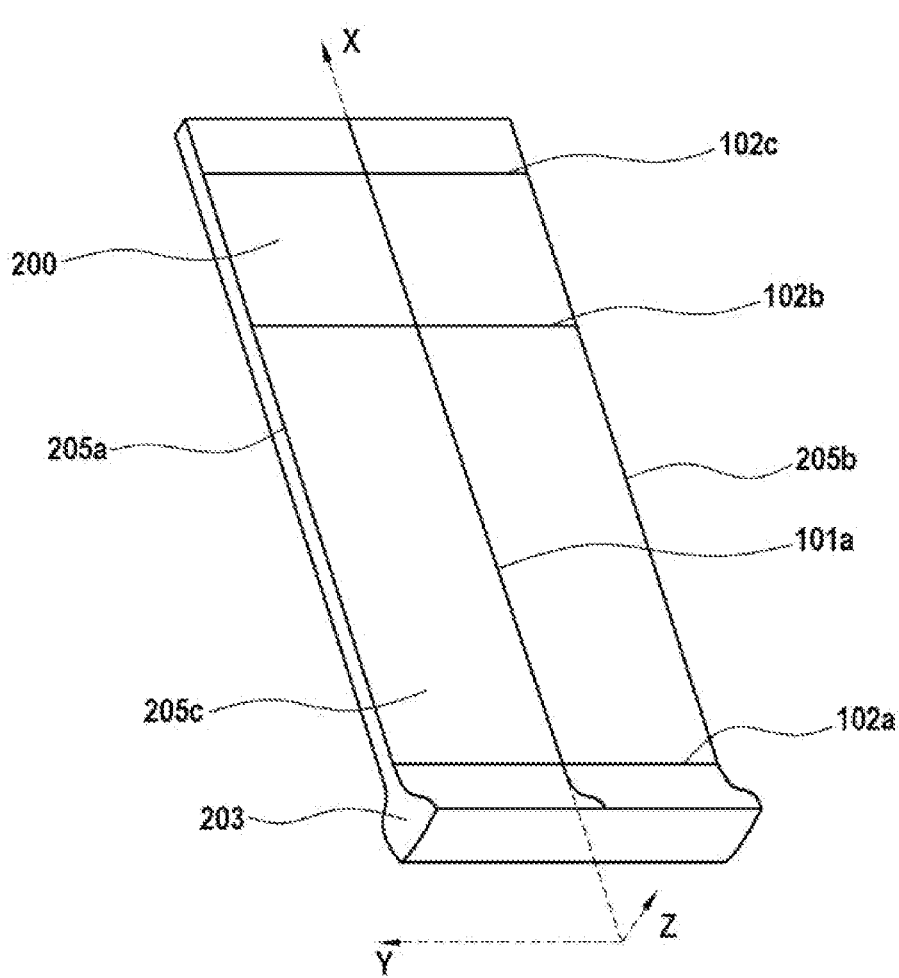

[Fig. 3]
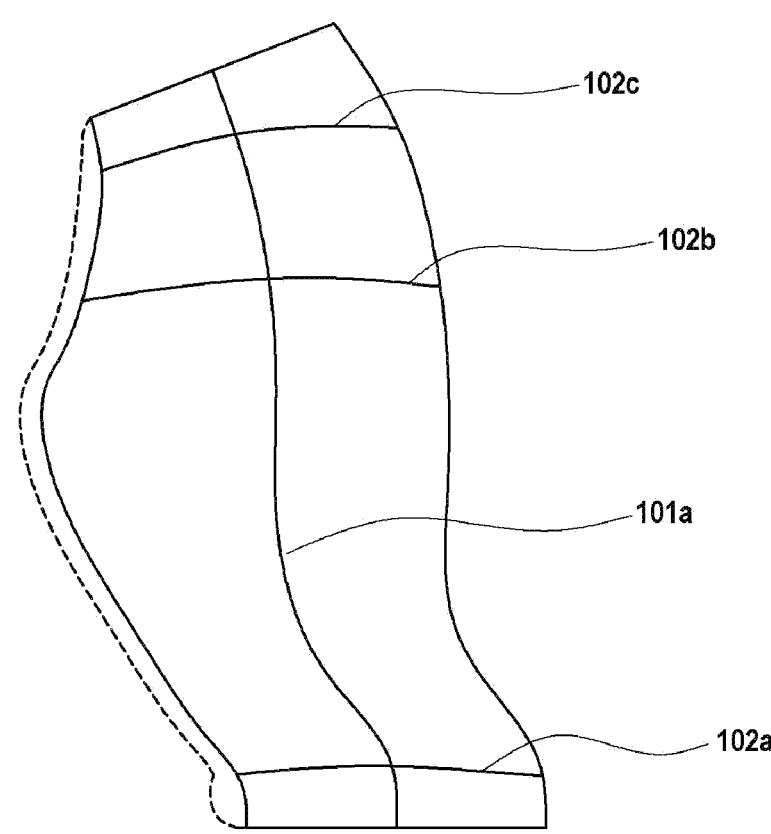

[Fig. 4]
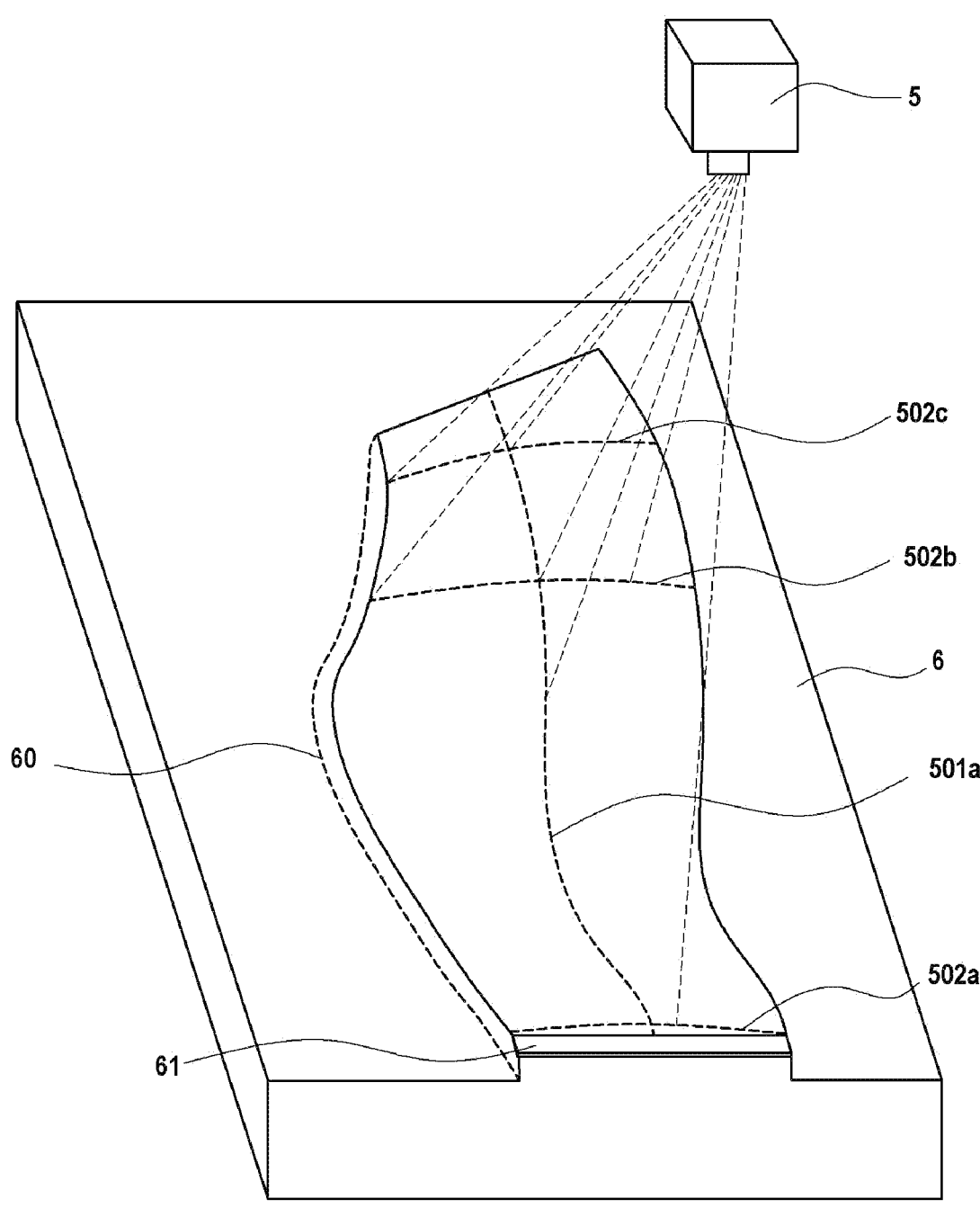

[Fig. 5]
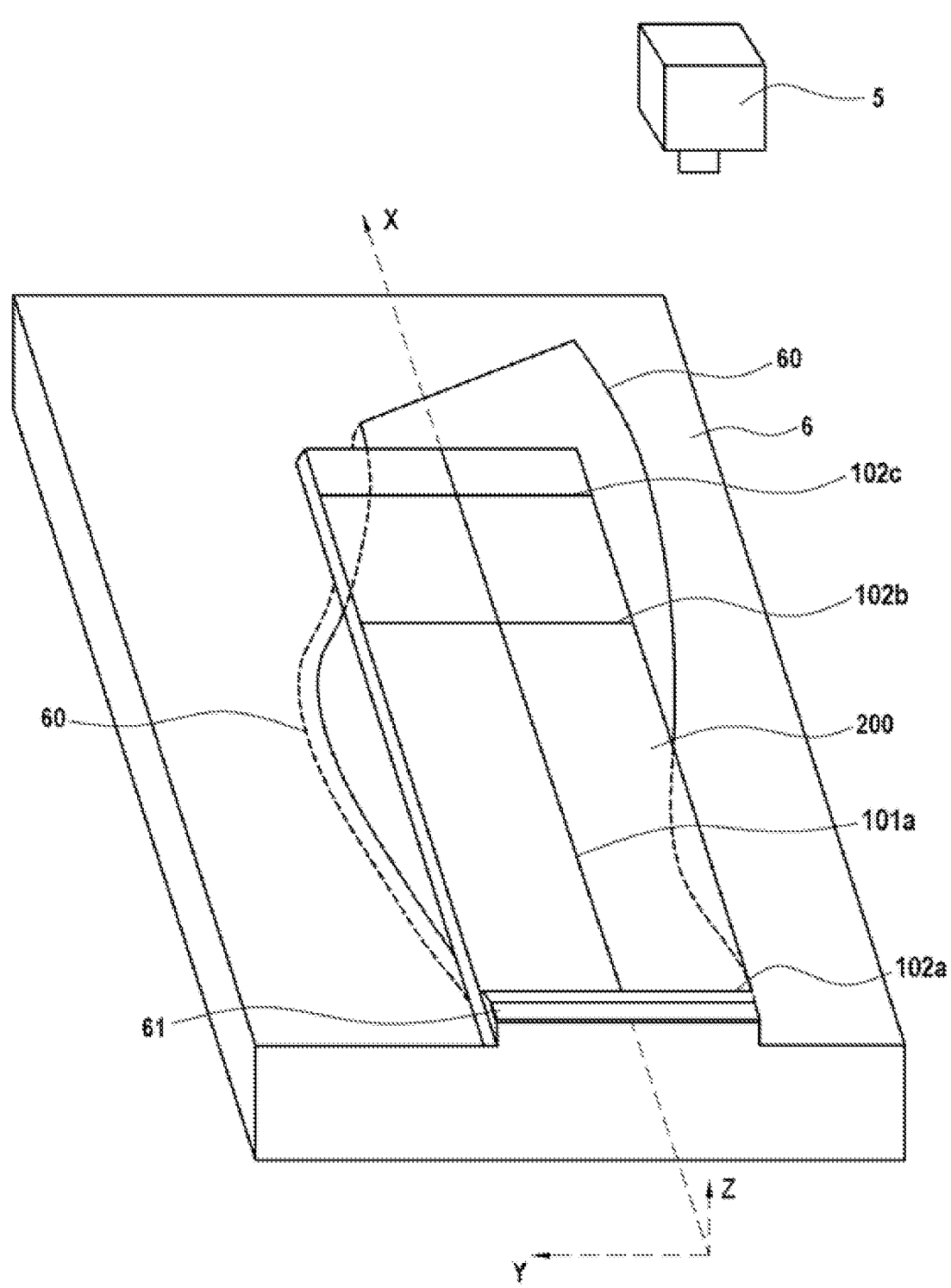

[Fig.6]
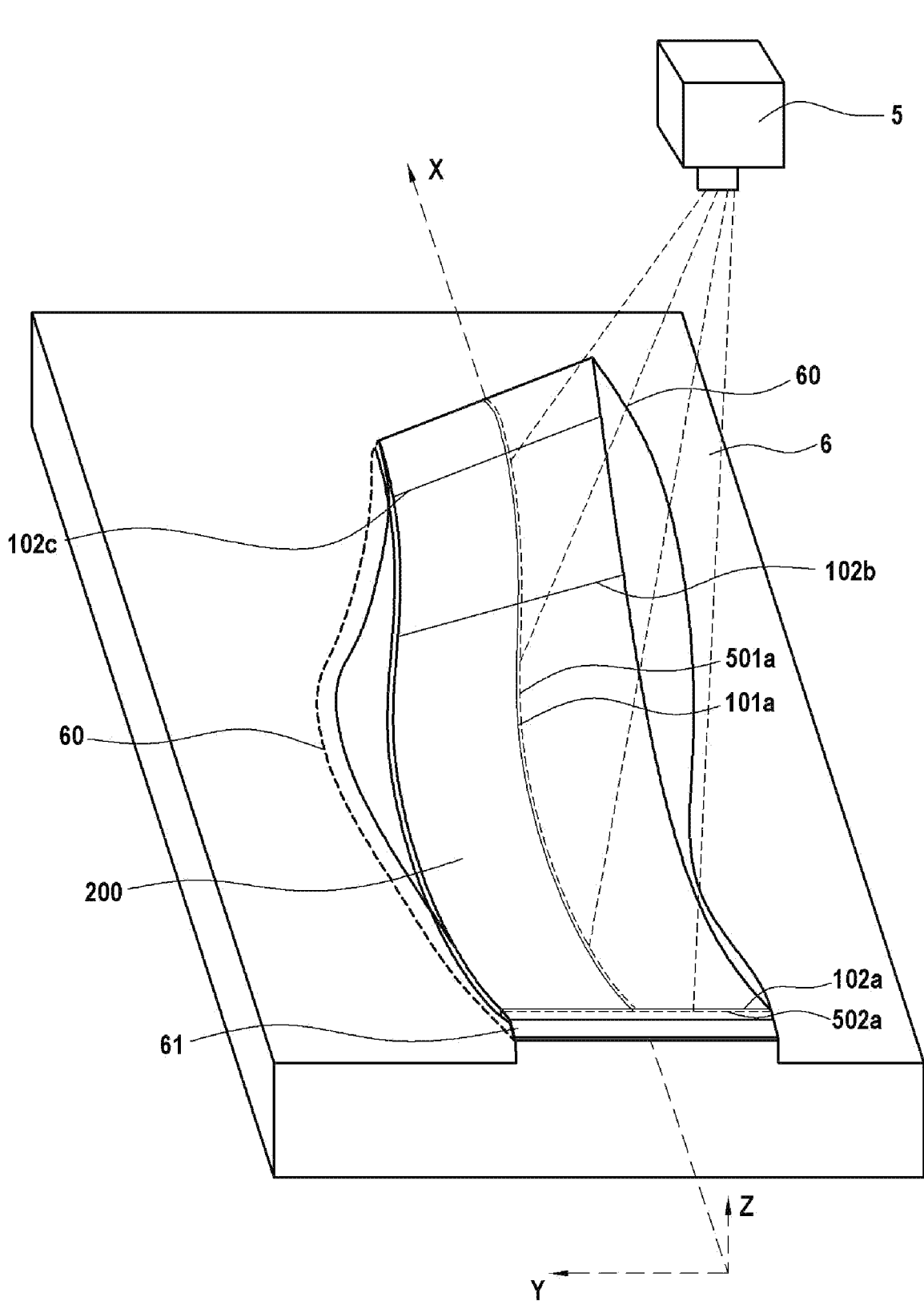

[Fig.7]
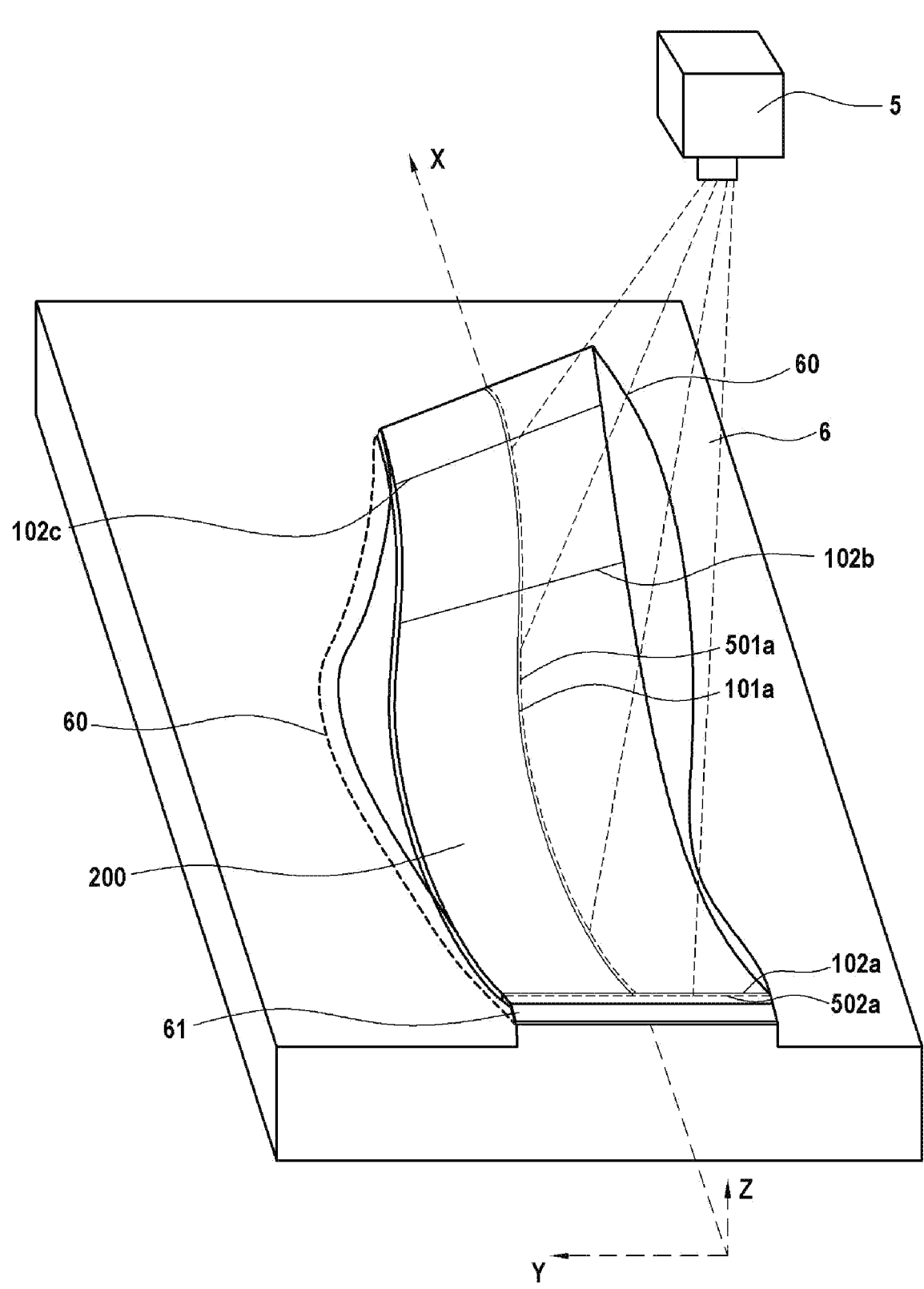

[Fig.8]
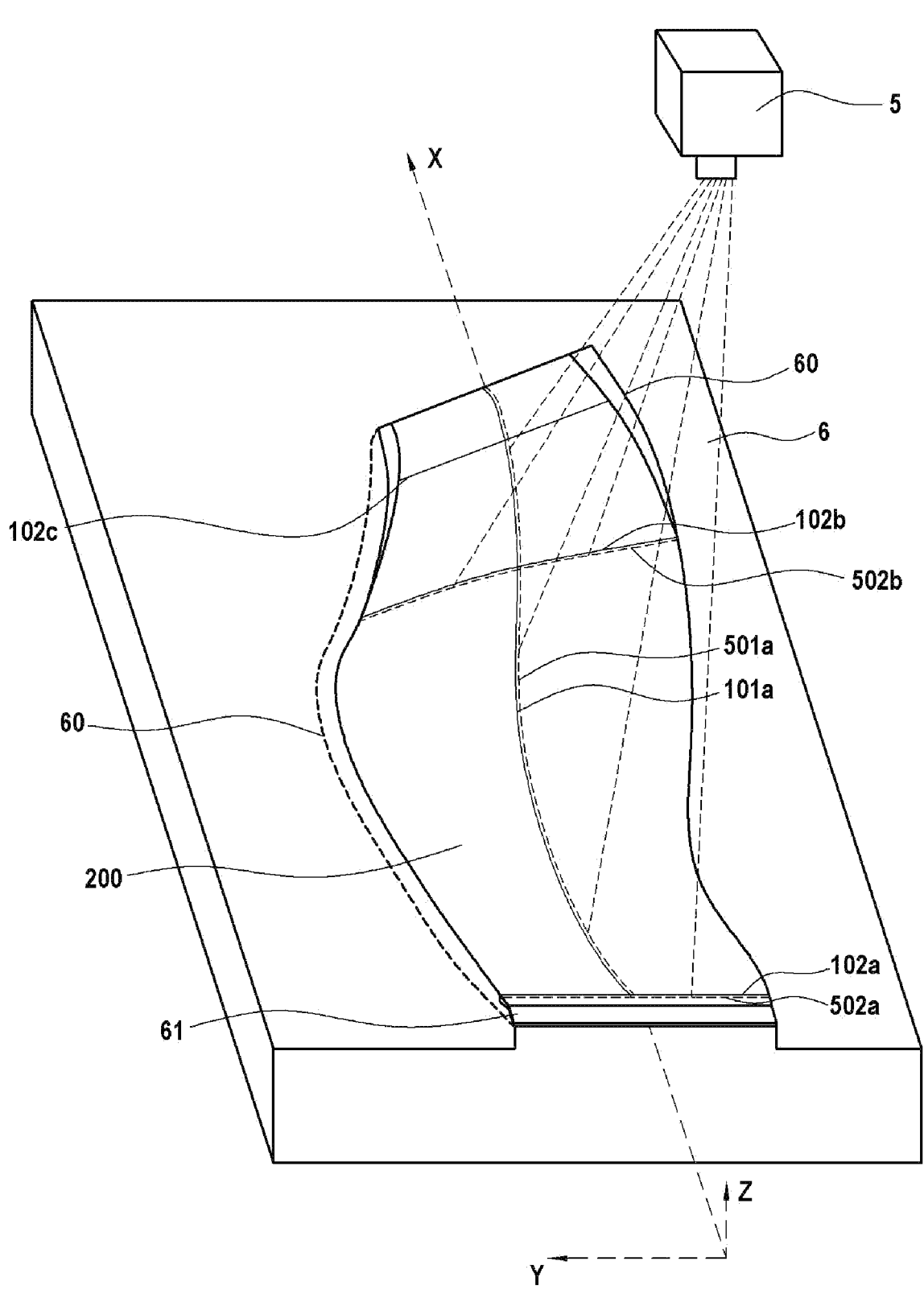

[Fig.9]
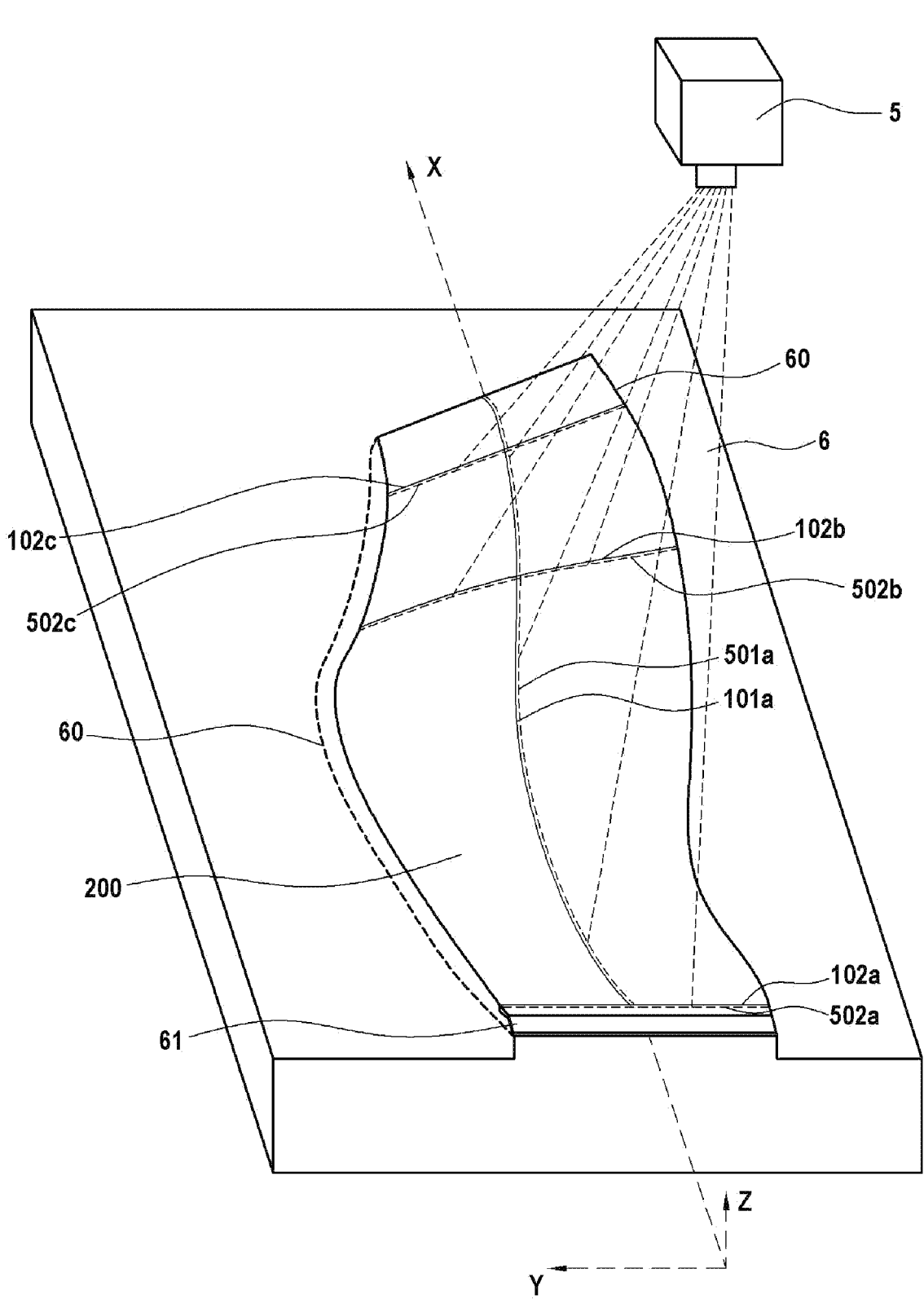

REPLICABLE SHAPING OF A FIBER BLANK

CROSS-REFERENCE TO RELATED APPLICATIONS

This application is the U.S. National Stage of PCT/FR2022/051223, filed Jun. 23, 2022, which in turn claims priority to U.S. patent application No. 63/216,250 filed Jun. 29, 2021 and French patent application number 22 03364 filed Apr. 12, 2022. The content of these applications are incorporated herein by reference in their entireties.

TECHNICAL FIELD

The invention relates to the manufacturing of blades or propellers made of composite material comprising a fiber reinforcement made by three dimensional weaving and densified by a matrix.

PRIOR TECHNIQUE

The use of composite materials for manufacturing blades or propellers, for example for gas turbine blades for aeronautical engines or for industrial turbines, makes it possible to obtain parts with mechanical performance equivalent or even superior to those made of metal, while having a much lower weight.

The manufacturing of these blades or propellers can start by the production of a one-piece fiber blank by three-dimensional weaving, which will then be shaped in such a way as to obtain a fiber preform of the blade or propeller to be manufactured. The fiber preform is then densified by a matrix to obtain the part. An example of a method for manufacturing a blade or a propeller made of composite material is for example described in the document FR3046564 or in the document FR3046563.

The fiber blank comprises two types of thread forming a network: the warp threads (which extend along the direction of weaving) and the weft threads (which extend transversally to the direction of weaving). The warp threads are substantially mutually parallel and the weft threads are substantially mutually parallel. Warp threads and weft threads generally intersect at a substantially right angle, thus forming a substantially orthogonal mesh of warp/weft threads.

However, the shape of the blades or propellers to be manufactured is not developable. Thus, when the fiber blank is deformed to obtain a fiber preform, it is possible to locally observe a loss of orthogonality of the warp-weft mesh. This loss of orthogonality is known as decadration. The angle measuring the separation between the decadrated position of a weft thread and its original position is known as the "decadration angle".

However, the greater the decadration angle, the more the mechanical properties of the fiber preform thus obtained will be modified. In traction and in compression, a so-called decadrated material is more flexible in the direction of the weft threads and stiffer in the direction of the warp threads. A considerable decadration will therefore lead to a relatively large loss of the mechanical properties in the weft direction. Thus, it will be necessary to manufacture a thicker fiber preform than it would have to be without decadration, which entails a non-negligible addition of weight for the performance of the turbine or engine.

The step of deforming the fiber blank into a fiber preform can be done using visual references, making it possible to control the disposition of certain weft or warp threads. Such a method is for example described in the document US2016288380A1. However, this step of deforming the fiber blank into a fiber preform is done by hand without any ordered shaping sequence, which generates great variability in the location of the zones where there is decadration from one part to another. Finally, one obtains great variability of mechanical properties from one part to another, and different geometries in the parts obtained after the step of injecting the resin into the preform.

SUMMARY OF THE INVENTION

The present invention has the aim of remedying the aforementioned drawbacks, by proposing a sequence of shaping of the predefined fiber blank, allowing an adapted and replicable deformation of the blank.

For this purpose, the invention proposes a method for shaping a fiber blank extending longitudinally along a direction X and transversally along a direction Y, obtained by three dimensional weaving between a plurality of warp threads and a plurality of weft threads and intended to form a fiber preform for a turbomachine blade, the fiber blank comprising a root blank intended to form the blade root and a airfoil blank intended to form the blade airfoil, the fiber blank comprising a reference face extending in the direction Y between a first edge and a second edge intended to form the leading edge and the trailing edge of the blade, the fiber blank further comprising a warp tracer thread extending over the reference face along the direction X from the root blank and at least one weft tracer thread extending over the reference face along the direction Y between the first edge and the second edge, the method comprising at least:
- the placement of the fiber blank in a shaping mold in such a way that the reference face is visible,
- the retaining of the root blank in the shaping mold,
- the projection of at least one visual reference of the warp on the reference face of the fiber blank corresponding to a reference location of the warp tracer thread,
- the deformation of the airfoil blank from the bottom of the airfoil blank to the top of the airfoil blank in the direction X such as to make the warp tracer thread correspond with the warp visual reference,
- the projection of at least one weft visual reference on the reference face of the fiber blank corresponding to a reference location of the weft tracer thread,
- the deformation of the airfoil blank in the direction Y from the warp tracer thread to the first edge and to the second edge of the blank such as to make the weft tracer thread correspond with the weft visual reference.

Thus, the method of shaping is predefined and identical between each operator. The deformation from the bottom to the top and from the center to the edges especially makes it possible to obtain from one part to the other identical locations for the decadration areas, and therefore better anticipation of the areas with weak mechanical properties in the weft direction.

According to a particular aspect of the invention, the fiber blank comprises a plurality of weft tracer threads distributed between the bottom of the airfoil blank and the top of the airfoil blank and wherein a plurality of weft visual references corresponding to a reference location of the weft tracer threads are projected, the following step being repeated for each weft tracer thread in order from the bottom of the airfoil blank to the top of the airfoil blank:
- the deformation of the airfoil blank in the direction Y from the warp tracer thread to the first edge and to the second edge of the blank such as to make the weft tracer thread correspond with the corresponding weft visual reference, such as to make all the weft tracer threads correspond with the corresponding weft visual reference.

According to another particular aspect of the invention, the deformation of the airfoil blank in the direction Y is done from the warp tracer thread to the first edge of the blank such as to make the weft tracer thread correspond with a part of the weft visual reference, then from the warp tracer thread to the second edge of the blank such as to make the weft tracer thread correspond with the corresponding weft visual reference.

According to another particular aspect of the invention, the projection of the visual references is done by laser.

According to another particular aspect of the invention, the visual reference corresponding to a tracer thread comprises a line of the same width as said tracer thread.

According to another particular aspect of the invention, the visual reference corresponding to a tracer thread comprises two lines delimiting an area corresponding to the reference location of said tracer thread.

According to another particular aspect of the invention, the fiber blank is moistened before being deformed to facilitate its deformation.

The invention further relates to a method for manufacturing a turbomachine blade made of composite material, comprising:

the production of a fiber blank by three-dimensional weaving of threads comprising a root blank intended to form the blade root and a airfoil blank intended to form the blade airfoil, the fiber blank comprising a reference face extending between a first edge and a second edge intended to form the leading edge and the trailing edge of the blade, the threads comprising a warp tracer thread and at least one weft tracer thread disposed at least on the reference surface, the cutting-out of the fiber blank while leaving intact the tracer threads located on the reference surface to obtain a trimmed fiber blank, able to take the shape and dimensions of the component parts of the blade, the shaping of the fiber blank according to the method for shaping according to the invention to obtain a shaped fiber preform, the injection into the fiber preform of a matrix precursor resin in order to impregnate the fiber preform, the transformation of the matrix precursor resin in the fiber preform into a matrix such as to obtain a composite material part comprising a fiber reinforcement densified by a matrix and having the shape and dimensions of the blade.

BRIEF DESCRIPTION OF THE DRAWINGS

FIG. 1 is a schematic perspective view of a fiber pre-blank produced by three dimensional weaving intended for the production of a fiber preform.

FIG. 2 is a schematic perspective view of a fiber blank obtained after cutting out the fiber pre-blank of FIG. 1.

FIG. 3 is a schematic view of a blade obtained after shaping and densification of the fiber blank of FIG. 2.

FIG. 4 is a schematic perspective view of a shaping mold and a laser projector according to an embodiment of the invention.

FIG. 5 is a schematic perspective view of the fiber blank of FIG. 2 disposed without being deformed in the shaping mold of FIG. 4.

FIG. 6 is a schematic perspective view of the fiber blank of FIG. 5 deformed such as to make the warp tracer thread coincide with its visual reference.

FIG. 7 is a schematic perspective view of the fiber blank of FIG. 6 deformed such as to make the first weft tracer thread coincide with its visual reference.

FIG. 8 is a schematic perspective view of the fiber blank of FIG. 7 deformed such as to make the second weft tracer thread coincide with its visual reference.

FIG. 9 is a schematic perspective view of the fiber blank of FIG. 8 deformed such as to make all the tracer threads coincide with their visual reference.

DESCRIPTION OF THE EMBODIMENTS

The invention applies in general to the production of blades or propellers made of composite material for turbomachines, the blade comprising a fiber reinforcement densified by a matrix. Hereinafter will be described the embodiments for a composite material blade. Of course, one does not depart from the scope of the invention if the composite material part produced is a propeller.

The method for manufacturing a composite material blade begins with the production of a fiber blank obtained by three dimensional weaving or by multi-layer weaving.

The term "three-dimensional weaving" or "3D weaving" is understood to mean a method of weaving by which at least some of the warp threads link weft threads over several layers of weft such as for example an "interlock weave". The term "interlock weave" is understood to mean a 3D weave in which each warp layer links several weft layers with all the threads of the same warp column having the same movement in the plane of the weave. It will be noted in general that the roles of the warp and weft threads are interchangeable.

The term "multilayer weave" is here understood to mean a three-dimensional weave with several layers of weft, for which the base weave of each layer is equivalent to a conventional 2D fabric weave, such as a weave of canvas, satin or serge type, but with certain points of the weave linking the weft layers to one another.

The production of the fiber blank by 3D weaving makes it possible to obtain a link between the layers, and thus to have good mechanical resistance of the fiber blank, and therefore of the composite material blade, in a single textile operation.

An exemplary embodiment of a fiber blank will now be described. In this example, the weave is produced on a loom of Jacquard type.

FIG. 1 schematically shows the weaving of a fiber pre-blank 100 from which can be extracted a fiber blank 200 (FIG. 2) used to obtain, after shaping, a fiber reinforcement preform of a blade or a propeller of an aeronautical engine.

The fiber pre-blank 100 is obtained by three-dimensional weaving, or 3D weaving, or by multi-layer weaving performed in a known manner by means of a weaving loom of Jacquard type on which has been disposed a bundle of warp threads or strands 101 in a plurality of layers, the warp threads being linked by weft threads 102 also disposed in a plurality of layers. In this way a substantially orthogonal warp-weft mesh is obtained. A detailed example of the production of a fiber blank intended to form the fiber reinforcement of a blade for an aeronautical engine from a 3D woven fiber blank is in particular described in detail in the documents U.S. Pat. Nos. 7,101,154, 7,241,112 and WO2010/061140.

The fiber pre-blank 100 is woven in the form of a strip extending generally in a direction X corresponding to the longitudinal direction of the blade to be produced. The fiber pre-blank 100 extends transversally along a direction Y, and in thickness along a direction Z perpendicular to the directions X and Y.

In the fiber pre-blank 100, the fiber blank 200 has a variable thickness determined as a function of the longitudinal thickness and the profile of the airfoil of the blade to be produced. In its part intended to form a root preform, the fiber blank 200 has an overthickness part 203 determined according to the thickness of the root of the blade to be produced. The fiber blank 200 is extended by a part of decreasing thickness 204 intended to form the web of the blade then by a part 205 intended to form the shank of the blade. The part 205 has in the direction Y a profile with variable thickness between its edge 205a intended to form the leading edge of the blade and its edge 205b intended to form the trailing edge of the blade to be produced. The part 205 extends in the direction Z between a first face 205c intended to form the pressure face of the blade profile and a second face 205d intended to form the suction face of the blade profile.

The fiber blank 200 is woven as a single part. In the parts of the fiber blank of varying thickness, as in the part of decreasing thickness 204, the reduction in the thickness of the blank can be obtained by gradually removing layers of weft during the weaving. Once the weaving of the blank 200 in the pre-blank 100 is finished, the nonwoven threads are cut. The blank 200 illustrated in FIG. 2 and woven as a single part is then obtained.

As illustrated in FIG. 2, the fiber blank 200 comprises structure threads 101 and 102, used for the weaving of the structure of the blank, and visually identifiable tracer threads 101a, 102a, 102b and 102c. The tracer threads 101a, 102a, 102b and 102c, incorporated during the weaving of the fiber pre-blank 100, are essentially located on the surface of the fiber blank 200. The tracer thread 101a is a warp thread. The tracer threads 102a, 102b and 102c are weft threads.

The tracer thread 101a can be placed at substantially equal distance from the edges 205a and 205b from the fiber blank intended to form the leading edge and the trailing edge of the blade or propeller to be manufactured.

FIG. 3 illustrates the location of the tracer threads on the part manufactured by shaping the fiber blank and the preform thus obtained by a matrix.

In the example shown in FIGS. 2 and 3, there is only a single warp tracer thread and three weft tracer threads. Of course, one does not depart from the scope of the invention if the number of weft tracer threads is less than or greater than three.

According to a particular embodiment of the invention, the structure threads can be carbon fibers, and the tracer threads can be glass or Kevlar fibers or fibers made of a carbon-glass mixture. Thus, the tracer threads appear as light in color against the rest of the blank which is dark.

Furthermore, the presence of these tracer threads can make it possible to facilitate or standardize the cutting-out of the fiber pre-blank to obtain the fiber blank. Examples of use of tracer threads to perform such cutting-out are for example described in the document US2015165571A1.

As illustrated in FIGS. 4 and 5, the fiber blank 200 is placed in a shaping mold 6 without being deformed. The shaping mold 6 possesses a cavity 60 having the shape of the desired fiber preform.

The fiber blank 200 is positioned in the shaping mold by placing the part 203 of the fiber blank intended to form the blade root in the part of the cavity 60 of the mold 6 intended to receive it.

According to a particular embodiment of the invention, the fiber blank 200 thus disposed in the mold without being deformed can be moistened, for example with distilled water.

The root of the fiber blank 200 is then blocked or fixed in the mold 6, for example by way of a pre-compacting jaw 61. The blocking of the blank root can cause the pre-compaction of said root and make it possible to block a portion of the root fibers in the desired position. By blocking the fiber blank by the root, and not by the part intended to form the blade root, a gentle transition is obtained between the blocked area and the unblocked area, in order to avoid the wrinkling of the fibers located at the border between the blocked area and the unblocked area.

When the fiber blank is disposed in the shaping mold 6, the blank can be placed in a configuration that deforms it while applying a rotation about an axis X parallel to the main direction while keeping the blank root fixed, which has the consequence of twisting the airfoil of the blank about this axis.

In some cases, provision can also be made for the shaping mold to have a sliding movable part intended to position itself against the free end of the blank root in order to then exert a stress providing the desired deformation of this portion of the blank, or avoiding certain types of deformation in this part while a deformation is exerted on other blank portions.

Different systems of marking and positioning of the blank can be used, in particular a laser projector 5 (see FIG. 4) which projects a light beam at the ideal location of one or more tracer threads such that it is then easy to consequently move the corresponding tracer thread to obtain the predetermined position. The light beam can be a laser of the same width as the tracer thread to which it corresponds. The light beam can be a laser projecting a wider width delimiting the reference area of the tracer thread to which it corresponds. The light beam can be a dual laser projecting two lines delimiting the reference area of the tracer thread to which it corresponds.

The coinciding of the tracer threads of the fiber blank 200 with their visual reference is done in several steps in a clearly determined order.

According to a first step illustrated in FIG. 6, the laser projector 5 starts by indicating at least the visual reference 501a of the warp tracer thread. This visual reference 501a of the warp tracer thread corresponds to the reference position of the warp tracer thread 101a on the fiber preform shaped in the shaping mold. Thus, the fiber blank 200 must be deformed such as to make the warp tracer thread 101a present on its face coincide with the visual reference 501a of the warp tracer thread. The fiber blank 200 is deformed from the bottom of the airfoil blank to the top of the airfoil blank, i.e. in the direction X of increasing abscissae, such as to superimpose the warp tracer thread 101a of the blank 200 with the visual reference 501a of the warp tracer thread.

By deforming the blank 200 from the bottom to the top, i.e. from the root of the blank to the upper edge of the airfoil blank, the decadration at the level of the root and the bottom of the airfoil is limited. Specifically, as the fiber blank 200 is deformed by moving away from the blocked part, the decadration becomes more and more significant. Since the material properties are usually less good at the level of the root and its join with the airfoil, it is preferably to limit the decadration to these places, to transfer it to the top of the airfoil where the material characteristics are better and will allow better tolerance to decadration. Furthermore, this deformation of the bottom of the blank 200 airfoil to the top of the blank 200 airfoil facilitates the replicability of the deformation with a controlled disposition of the decadration areas.

According to a second step illustrated in FIG. 7, the laser projector 5 then indicates at least the visual reference 502*a* of the first weft tracer thread starting from the bottom of the blank 200 airfoil, i.e. from the first weft tracer thread in the direction X of increasing abscissae. This visual reference 502*a* of the first weft tracer thread corresponds to the reference position of the first weft tracer thread 102*a* on the fiber preform shaped in the shaping mold. Thus, the fiber blank 200 must be deformed such as to make the first weft tracer thread 102*a* present on its face coincide with the visual reference 502*a* of the first weft tracer thread. Preferably, the laser projector 5 also indicates the visual reference 501*a* of the warp tracer thread.

The fiber blank 200 is deformed from the warp tracer thread 101*a* to the edge 205*a* of the fiber blank 200 intended to form the leading edge of the blade, i.e. in the direction of increasing Y ordinates, such as to superimpose the first weft tracer thread 102*a* of the blank 200 on the part of the visual reference 502*a* of the first weft tracer thread located between the warp tracer thread 101*a* and the edge 205*a* of the fiber blank 200 intended to form the leading edge.

Next the fiber blank is deformed 200 from the warp tracer thread 101*a* to the edge 205*b* of the fiber blank 200 intended to form the trailing edge of the blade, i.e. in the direction of decreasing Y ordinates, such as to superimpose the first weft tracer thread 102*a* of the blank 200 with the part of the visual reference 502*a* of the first weft tracer thread located between the warp tracer thread 101*a* and the edge 205*b* of the fiber blank intended to form the trailing edge.

After deforming the fiber blank 200 on both sides of the warp tracer thread 101*a*, the first weft tracer thread 102*a* is correctly superimposed over its entire length on the visual reference 502*a* of the weft tracer thread. At the end of this second step, the warp tracer thread 101*a* remains preferably superimposed on its corresponding visual reference 501*a*.

According to a third step illustrated in FIG. 8, the laser projector 5 then indicates at least the visual reference 502*b* of the second weft tracer thread starting from the bottom of the blank 200 airfoil, i.e. from the second weft tracer thread in the direction X of increasing abscissae. This visual reference 502*b* of the second weft tracer thread corresponds to the reference position of the second weft tracer thread 102*b* on the fiber preform shaped in the shaping mold. Thus, the fiber blank 200 must be deformed such as to make the second weft tracer thread 102*b* present on its face coincide with the visual reference 502*b* of the second weft tracer thread. Preferably, the laser projector 5 also indicates the visual reference 501*a* of the warp tracer thread and the reference 502*a* of the second weft tracer thread.

The fiber blank 200 is deformed from the warp tracer thread 101*a* to the edge 205*a* of the fiber blank 200 intended to form the leading edge of the blade, i.e. in the direction of increasing Y ordinates, such as to superimpose the second weft tracer thread 102*b* of the blank 200 with the part of the visual reference 502*b* of the second weft tracer thread located between the warp tracer thread 101*a* and the edge 205*a* of the fiber blank 200 intended to form the leading edge.

Next the fiber blank 200 is deformed from the warp tracer thread 101*a* to the edge 205*b* of the fiber blank 200 intended to form the trailing edge of the blade, i.e. in the direction of decreasing Y ordinates, such as to superimpose the second weft tracer thread 102*b* of the blank 200 with the part of the visual reference 502*b* of the second weft tracer thread located between the warp tracer thread 101*a* and the edge 205*b* of the fiber blank intended to form the trailing edge.

After deforming the fiber blank 200 on both sides of the warp tracer thread 101*a*, the second weft tracer thread 102*b* is correctly superimposed over its entire length on the corresponding visual reference 502*b* of the weft tracer thread. At the end of this third step, the warp tracer thread 101*a* remains preferably superimposed on its corresponding visual reference 501*a*, and the first weft tracer thread 102*a* remains preferably superimposed on its visual reference 502*a*.

According to a fourth step illustrated in FIG. 9, the laser projector 5 then indicates at least the visual reference 502*c* of the third weft tracer thread starting from the bottom of the blank 200 airfoil, i.e. from the second weft tracer thread in the direction X of increasing abscissae. This visual reference 502*c* of the third weft tracer thread corresponds to the reference position of the third weft tracer thread 102*c* on the fiber preform shaped in the shaping mold. Thus, the fiber blank 200 must be deformed such as to make the third weft tracer thread 102*c* present on its face coincide with the visual reference 502*c* of the third weft tracer thread. Preferably, the laser projector 5 also indicates the visual reference 501*a* of the warp tracer thread, the reference 502*a* of the second weft tracer thread and the reference 502*b* of the third weft tracer thread.

The fiber blank 200 is deformed from the warp tracer thread 101*a* to the edge 205*a* of the fiber blank 200 intended to form the leading edge of the blade, i.e. in the direction of increasing Y ordinates, such as to superimpose the third weft tracer thread 102*b* of the blank 200 with the part of the visual reference 502*c* of the third weft tracer thread located between the warp tracer thread 101*a* and the edge 205*a* of the fiber blank 200 intended to form the leading edge.

Next the fiber blank 200 is then deformed from the warp tracer thread 101*a* to the edge 205*b* of the fiber blank 200 intended to form the trailing edge of the blade, i.e. in the direction of decreasing Y ordinates, such as to superimpose the third weft tracer thread 102*c* of the blank 200 with the part of the visual reference 502*c* of the third weft tracer thread located between the warp tracer thread 101*a* and the edge 205*b* of the fiber blank intended to form the trailing edge.

After deforming the fiber blank 200 on both sides of the warp tracer thread 101*a*, the third weft tracer thread 102*c* is correctly superimposed over its entire length on the corresponding visual reference 502*c* of the weft tracer thread. At the end of this third step, the warp tracer thread 101*a* remains preferably superimposed on its corresponding visual reference 501*a*, the first weft tracer thread 102*a* remains preferably superimposed on its visual reference 502*a* and the second weft tracer thread 102*b* remains preferably superimposed on its visual reference 502*b*.

In the example illustrated in FIGS. 4 to 9, there is only single warp tracer thread and three weft tracer threads. Of course one does not depart from the scope of the invention if the number of weft tracer threads is less than or greater than three.

For each additional weft tracer thread located above the previous weft tracer thread in the direction of increasing abscissae, one proceeds in the same way as in the fourth step. The laser projector must display the visual reference corresponding to the additional weft tracer thread, preferably by displaying the visual reference corresponding to the warp tracer thread and to the previous weft tracer threads. The fiber blank 200 is then deformed from the warp tracer thread 101*a* to the edge 205*a* of the fiber blank 200 intended to form the leading edge of the blade, then the fiber blank 200 is deformed from the warp tracer thread 101*a* to the edge 205*b* of the fiber blank 200 intended to form the trailing edge of the blade, such as to superimpose over its entire length the additional weft thread with the corresponding visual reference. At the end of this additional step, the warp tracer thread remains preferably superimposed on its corresponding visual reference and the previous weft tracer threads remain preferably superimposed on their corresponding visual reference.

Deforming the fiber blank 200 from the warp tracer thread 101*a*, preferably positioned toward the center of the fiber blank 200, toward the edges of the blank, ensures a good replicability of the deformation and a good control of the location of the decadration areas, which will be mostly located on the edges of the blank.

By deforming the fiber blank 200 to make the weft tracer threads correspond to their visual reference from the bottom of the blank airfoil to the top of the blank airfoil, the decadration is limited at the level of the root and the bottom of the airfoil. Specifically, as the fiber blank 200 is gradually deforming by moving away from the blocked part, i.e. the blade root, the decadration becomes more and more significant. Since the material properties are habitually less good at the level of the root and at its join with the airfoil, it is preferable to limit the decadration to these places, to transfer it to the top of the airfoil where the material characteristics are better and will allow better tolerance to decadration. Further, this deformation of the bottom of the blank 200 airfoil toward the top of the blank 200 airfoil facilitates the replicability of the deformation with a controlled disposition of the decadration areas.

Of course, one does not depart from the scope of the invention if the roles of the edge of the blank intended to form the leading edge of the blade and of the edge of the blank intended to form the trailing edge are exchanged or alternated in the preceding steps. The deformation of the fiber blank from the warp tracer thread to a first edge of the blank for each weft tracer thread simplifies the deformation of the fiber blank in the direction Y ordinates. An operator alone can easily and quickly repeat this series of deformations while preserving a good replicability and a location of the decadration areas that is identical from one blade to the other. This series of deformations constitutes a preferred embodiment of the invention.

However, one does not depart from the scope of the invention if the deformation of the fiber blank in the direction of the Y ordinates is done simultaneously or alternatively on either side of the warp tracer thread toward each of the edges to superimpose a weft tracer thread on its corresponding visual reference. However, this series of deformations are relatively difficult to implement for a single operator, while preserving good replicability.

When the fiber blank is entirely deformed, it is possible to display again all the visual references of the tracer threads—with or without the tolerances—such as to verify that all the tracer threads are correctly superimposed on the corresponding visual references. Minor deformations can be effected to ensure the satisfactory superimposition of all the tracer threads on their visual reference.

If the fiber blank was moistened before the deformation steps, it can be dried after being deformed.

After these deformation steps, it is possible to proceed to a step of compacting the deformed fiber blank in a compacting mold, where applicable preceded by a pre-compacting step. These pre-compacting or compacting steps are for example described in the document US2016243777A1 or US2016288380A1. The compacting mold may comprise the shaping mold.

One thus obtains a fiber preform after shaping and where applicable compacting of the fiber blank.

The fiber preform is then impregnated with a thermosetting resin that is cured by heat treatment. For example, the well-known injection or transfer molding known as RTM ("Resin Transfer Molding") can be used for this purpose. In accordance with the RTM method, one injects via an injection port a resin, for example a thermosetting resin, into the inner space occupied by the preform in the injection mold. This configuration allows the establishment of a pressure gradient between the lower part of the preform where the resin is injected and the upper part of the preform located near the drainage port. In this way, the resin injected substantially at the level of the lower part of the preform will gradually impregnate the whole preform by circulating in it all the way to the drainage port through which the surplus is drained. Of course, the injection molding tooling may comprise several injection ports and several drainage ports.

The resins suitable for RTM methods are well known. They preferably have low viscosity to facilitate their injection into the fibers. The choice of the temperature class and/or chemical nature of the resin is determined as a function of the thermomechanical stresses to which the part must be subjected. Once the resin is injected into the whole reinforcement, it is then cured by heat treatment in accordance with the RTM method.

After injection and curing, the blade is released from the mold. It can where applicable undergo a post-baking cycle to improve its thermomechanical properties. Finally, the blade is trimmed to remove the excess resin and chamfers can be machined. A composite part is thus obtained, formed of a fiber reinforcement densified by a matrix.

Protective layers can be bonded to the composite part thus obtained.

The invention claimed is:

1. A method for shaping a fiber blank extending longitudinally along a direction X and transversally along a direction Y, obtained by three-dimensional weaving between a plurality of warp threads and a plurality of weft threads and intended to form a fiber preform for a turbomachine blade, the fiber blank comprising a root blank intended to form the blade root and a airfoil blank intended to form the blade airfoil, the fiber blank comprising a reference face extending in the direction Y between a first edge and a second edge intended to form the leading edge and the trailing edge of the blade, the fiber blank further comprising a warp tracer thread extending over the reference face along the direction X from the root blank and at least one weft tracer thread extending over the reference face along the direction Y between the first edge and the second edge, the method comprising:

placing the fiber blank in a shaping mold in such a way that the reference face is visible, retaining the root blank in the shaping mold, projecting at least one visual reference of the warp on the reference face of the fiber blank corresponding to a reference location of the warp tracer thread, deforming the airfoil blank from the bottom of the airfoil blank to the top of the airfoil blank along the direction X in a first deformation bottom-to-top sequence to progressively align the warp tracer thread with the warp visual reference, projecting at least one weft visual reference on the reference face of the fiber blank corresponding to a reference location of the weft tracer, and deforming the airfoil blank along the direction Y in a second deformation sequence different from the first deformation bottom-to-top sequence from the warp tracer thread outwardly to the first edge and from the warp tracer thread outwardly to the second edge of the blank to progressively align the weft tracer thread with the projected weft visual reference.

2. The shaping method as claimed in claim 1, wherein the fiber blank comprises a plurality of weft tracer threads distributed between the bottom of the airfoil blank and the top of the airfoil blank and wherein a plurality of weft visual references corresponding to a reference location of the weft tracer threads are projected, the following step being repeated for each weft tracer thread in order from the bottom of the airfoil blank to the top of the airfoil blank:

deforming the airfoil blank in the direction Y from the warp tracer thread to the first edge and to the second edge of the blank such as to make the weft tracer thread correspond with the corresponding weft visual reference, such as to make all the weft tracer threads correspond with the corresponding weft visual references.

3. The shaping method as claimed in claim 1, wherein the deformation of the airfoil blank in the direction Y is done from the warp tracer thread to the first edge of the blank such as to make the weft tracer thread correspond with a part of the weft visual reference, then from the warp tracer thread to the second edge of the blank to make the weft tracer thread correspond with the corresponding weft visual reference.

4. The shaping method as claimed in claim 1, wherein the projection of the visual references is done by laser.

5. The shaping method as claimed in claim 1, wherein the visual reference corresponding to a tracer thread comprises a line of the same width as said tracer thread.

6. The shaping method as claimed in claim 1, wherein the visual reference corresponding to a tracer thread comprises two lines delimiting an area corresponding to the reference location of said tracer thread.

7. The shaping method as claimed in claim 1, wherein the fiber blank is moistened before being deformed to facilitate its deformation.

8. A method for manufacturing a turbomachine blade made of composite material, comprising:

producing a fiber blank by three-dimensional weaving of threads comprising a root blank intended to form the blade root and a blade blank intended to form the blade airfoil, the fiber blank comprising a reference face extending between a first edge and a second edge intended to form the leading edge and the trailing edge of the blade, the threads comprising a warp tracer thread and at least one weft tracer thread disposed at least on the reference surface, cutting-out the fiber blank while leaving intact the tracer threads located on the reference surface to obtain a trimmed fiber blank, able to take the shape and dimensions of the component parts of the blade, shaping the fiber blank according to the method for shaping as claimed in claim 1 to obtain a shaped fiber preform, injection into the fiber preform of a matrix precursor resin in order to impregnate the fiber preform, and transformation of the matrix precursor resin in the fiber preform into a matrix such as to obtain a composite material part comprising a fiber reinforcement densified by a matrix and having the shape and dimensions of the blade.

\* \* \* \* \*